United States Patent [19]
Perrella et al.

[11] 3,887,542
[45] June 3, 1975

[54] POLYISOCYANATE AND POLYISOTHIOCYANATE DERIVATIVES OF 6-AMINOPENICILLANIC ACID

[75] Inventors: Donald J. Perrella, Princeton Junction; Joseph E. Dolfini, Princeton, both of N.J.

[73] Assignee: E. R. Squibb & Sons, Inc., Princeton, N.J.

[22] Filed: Sept. 22, 1972

[21] Appl. No.: 291,439

[52] U.S. Cl............................. 260/239.1; 424/271
[51] Int. Cl............................................. C07d 99/22
[58] Field of Search................................. 260/239.1

[56] References Cited
UNITED STATES PATENTS
3,303,185  2/1967  Fraser............................ 260/239.1
3,632,578  1/1972  Chauvette...................... 260/239.1

FOREIGN PATENTS OR APPLICATIONS
695,831  10/1964  Canada........................... 260/239.1

OTHER PUBLICATIONS
Swenehart; Organic Chemistry: An Experimental Approach; 1969, p. 388.

Primary Examiner—Nicholas S. Rizzo
Assistant Examiner—Mary C. Vaughn
Attorney, Agent, or Firm—Lawrence S. Levinson; Merle J. Smith; Stephen B. Davis

[57] ABSTRACT

Derivatives of polyfunctional compounds such as diisocyanates or diisothiocyanates wherein each functional group is reacted with 6-aminopenicillanic acid possess antibacterial activity.

8 Claims, No Drawings

POLYISOCYANATE AND POLYISOTHIOCYANATE DERIVATIVES OF 6-AMINOPENICILLANIC ACID

The present invention relates to antibacterial agents, and more particularly, to antibacterial agents containing at least two penicillin moieties.

It is an object of the present invention to provide new antibacterial agents. Another object is to provide antibacterial agents of improved efficacy. A further object is to provide antibacterial agents which contain at least two antibacterial moieties. Still another object is to provide antibacterial agents from di- or higher polyfunctional compounds. These and other objects of the present invention will be apparent as the description proceeds.

SUMMARY OF THE INVENTION

The antibacterial agents of the present invention comprise derivatives of di- or higher polyfunctional compounds, such as di- or higher polyisocyanates or isothiocyanates wherein at least two isocyanate or isothiocyanate groups are reacted with 6-aminopenicillanic acid (6-APA).

DETAILED DESCRIPTION

The di- or higher polyfunctional starting compounds of the present invention comprise a diisocyanate or higher polyfunctional isocyanate or a corresponding isothiocyanate and 6-APA. At least two functional groups of the starting isocyanate or isothiocyanate are reacted with 6-APA or a salt or ester thereof.

Various types of isocyanates or isothiocyanates may be used in the present invention. The isocyanate or isothiocyanate may be aliphatic, alicyclic, aromatic or heterocyclic. Some examples are the following:

1. Aliphatic isocyanates - ethylene diisocyanate, propylene-1,2-diisocyanate, butylene-1,3-diisocyanate, tetramethylene diisocyanate, pentamethylene diisocyanate, hexamethylene diisocyanate, butane-1,2,4-triisocyanate, etc., and the corresponding isothiocyanates;

2. Aromatic isocyanates - p-phenylene diisocyanate, 2,4-tolylenediisocyanate, 2,4-chlorophenylene diisocyanate, 2,6-tolylenediisocyanate, diphenyl-4,4'-diisocyanate, p-isocyanatobenzyl isocyanate, diphenylmethane-4,4'-diisocyanate, 3,3'-bitolylene-4,4'-diisocyanate, 3,3'-dimethyldiphenylmethane-4,4'-diisocyanate, 1,2,4-benzene triisocyanate, 1,2,5-benzene triisocyanate, etc., and the corresponding isothiocyanates;

3. Alicyclic isocyanates - 1,2-diisocyanocyclohexane, 1,3-diisocyanocyclohexane, 1,4-diisocyanocyclohexane, cyclopentyl-1,3-diisocyanate, etc., and the corresponding isothiocyanates.

4. Heterocyclic isocyanates - pyridine-2,6-diisocyanate, furan-2,5-diisocyanate, thiophene-2,4-diisocyanate, thiophene-2,5-diisocyanate, pyrimidine-4,6-diisocyanate, pyrimidine-4,5,6-triisocyanate, etc., and the corresponding isothiocyanates.

The compounds of the present invention include the free acids as well as physiologically acceptable metal salts, esters, or salts of physiologically acceptable organic bases. Examples of suitable metal salts include the alkali metal and alkaline earth metal salts, e.g., the Na, K, Mg and Ca. The ammonium ion may be included among the alkali metals. Examples of suitable esters include radicals derived from alcohols of up to 7 carbon atoms, e.g., methyl, propyl, t-butyl, trichloroethyl, pivaloyloxymethyl, benzyl, p-nitrophenyl, trimethyl silyl, trimethyl stannyl, methoxymethyl, and the like. Examples of suitable bases include substituted ammonium salts, e.g., salts of nontoxic amines such as trialkylamines, including triethylamine, procaine, dibenzylamine, N-benzyl-$\beta$-phenethylamine, N,N'-dibenzylethylenediamine, N-(lower)alkylpiperidine, e.g., N-ethylpiperidine and other amines which have been used to form salts with benzylpenicillin and the like. The foregoing metal salts or organic bases and esters are prepared according to known techniques.

The compounds of this invention form salts which are also part of the invention. Basic salts form with the carboxyl group of the 6-APA moiety. It is frequently convenient to isolate and purify the product by forming a soluble or insoluble salt, as desired, then regenerating the free compound, by neutralization for example.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to penicillin G and other penicillins and cephalosporins. For example, a compound of the invention or a physiologically acceptable salt thereof may be used in various animal species in an amount of about 0.1 to 100 mg/kg daily, orally or parenterally, in single or two to four divided doses to treat infections of bacterial origin. Up to about 600 mg of a compound of the invention or a salt thereof may be incorporated in an oral dosage form such as tablets, capsules or elixirs or in an injectable form in a sterile aqueous vehicle prepared according to conventional pharmaceutical practice. In cleaning or disinfecting compositions, e.g., in barns or dairy equipment, a concentration of about 0.01 to 1% by weight of such compounds admixed with, suspended or dissolved in conventional inert dry or aqueous carriers for application by washing or spraying may be used.

The compounds of the present invention may be readily prepared by reacting 6-APA, the carboxyl group of which is protected, with an isocyanate or isothiocyanate. The reaction takes place in an inert solvent such as, for example, chloroform, benzene, toluene, ethylene chloride, methylene chloride, dioxane, nitromethane, acetonitrile, dimethylformamide or diethyl ether, or mixtures of the foregoing solvents. The carboxyl group of the 6-APA moiety may be protected by any convenient ester group which will not interfere with reaction between the amino group of the 6-APA moiety and either the isocyanate or isothiocyanate compound. The reaction takes place at temperatures in the range of from about −30°C to about 20°C.

While examples of specific polyisocyanates and polyisothiocyanates have been given previously, it is to be understood that any polyisocyanate or polyisothiocyanate may be employed according to the present invention provided no substituents are present which would interfere with the reaction with the antibacterial moiety. With the foregoing understanding, the following paragraphs describe preferred compounds.

The aliphatic polyisocyanates or polyisothiocyanates, examples of which have been given previously, comprise polyisocyanates or polyisothiocyanates of from 2 to about 10 carbon atoms (including those in the isocyanate or isothiocyanate groups).

The aromatic polyisocyanates or polyisothiocyanates, examples of which have been given previously, comprise benzene or benzyl polyisocyanates or polyisothiocyanates of from 8 to about 10 carbon atoms (including those in the isocyanate or isothiocyanate groups) or a benzene isocyanate or isothiocyanate joined directly or through a methylene group to a second benzene isocyanate or isothiocyanate, respectively, in which case the compound has from 14 to about 17 carbon atoms (including those in the isocyanate or isothiocyanate groups). The benzene rings may be substituted, e.g., by a halogen atom, or by methyl groups as long as the upper limits of carbon atoms are not exceeded.

The alicyclic polyisocyanates or polyisothiocyanates, examples of which have been given previously, comprise cycloalkyl compounds of 5 or 6 carbon atoms in the ring which carbons may be substituted by a methyl group or by a halogen, and which compounds have a total of from 7 to about 10 carbon atoms (including those in the isocyanate or isothiocyanate groups).

The heterocyclic isocyanates or isothiocyanates, examples of which have been given previously, comprise 5- or 6-membered rings containing a single heteroatom which may be N, O, or S, or two nitrogen heteroatoms, and which have a total of from 6 to about 8 carbon atoms (including those in the isocyanate or isothiocyanate groups).

The following examples illustrate the present invention without, however, limiting the same thereto. All temperatures are expressed in degrees Celsius.

EXAMPLE 1

Ethylenediamine-bis-N,N'-(6-Carbonylaminopenicillanic Acid)

A solution of 6-aminopenicillanic acid (2 mmole) and triethylamine (4 mmole) in 25 mg of pure chloroform is cooled to −10°C. Trimethylsilyl chloride (4 mmole) is then added over a 10-minute interval. The resulting mixture is stirred for about 30 minutes more. Triethylamine (2 mmoles) is again added followed by a solution of ethylene diisocyanate (1 mmole) in 10 ml of pure chloroform added over a ten-minute interval, the temperature being maintained at −10°C. After an additional 1 hour of stirring at this temperature, the reaction mixture is poured into cold water and the pH adjusted to about 3.5. The chloroform layer containing the product is separated. This organic layer is then layered with water and the pH of the aqueous layer adjusted to pH 7.5 with dilute sodium hydroxide with vigorous shaking of the mixture. The chloroform layer is drawn off and the aqueous solution of the product is layered with ethyl acetate. The pH of the aqueous solution is lowered to 3.5; the ethyl acetate layer is washed with water and saturated aqueous sodium chloride. After drying and evaporating the ethyl acetate layer, the title compound is obtained.

EXAMPLE 2

1,4-Phenylenediamine-bis-N,N'-(6-Carbonylaminopenicillanic Acid)

Following the procedure of Example 1 but substituting 1 mmole of 1,4-phenylenediisocyanate for ethylene diisocyanate, the title compound is obtained.

EXAMPLE 3

1,4-Cyclohexyldiamine-bis-N,N'-(6-Carbonylaminopenicillanic Acid)

Following the procedure of Example 1 but substituting 1 mmole of 1,4-cyclohexyldiisocyanate for ethylene diisocyanate, the title compound is obtained.

EXAMPLE 4

2,6-Pyridyldiamine-bis-N,N'-(6-Carbonylaminopenicillanic Acid)

Following the procedure of Example 1 but substituting 1 mmole of pyridine-2,6-diisocyanate for ethylene diisocyanate, the title compound is obtained.

EXAMPLES 5–26

Following the procedure of Example 1 but substituting for ethylene diisocyanate 1 mmole of the compound in Column I, there is obtained a compound of the following formula

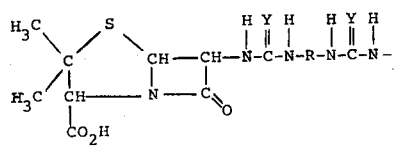

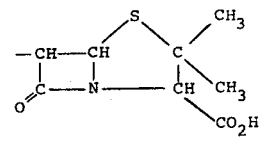

wherein R is the radical indicated in Column II and Y is as indicated in Column III.

| Example | I | II | III |
|---|---|---|---|
| 5 | Propylene-1,2-diisothiocyanate | —CH$_2$CH$_2$CH$_2$— | S |
| 6 | Butylene-1,3-diisocyanate | —CH$_2$CH$_2$CH—<br>\|<br>CH$_3$ | O |
| 7 | Tetramethylene diisocyanate | —CH$_2$CH$_2$CH$_2$CH$_2$— | S |
| 8 | Pentamethylene diisocyanate | —CH$_2$(CH$_2$)$_3$CH$_2$— | O |

Continued

| Example | I | II | III |
|---|---|---|---|
| 9 | Hexamethylene diisothiocyanate | —CH$_2$(CH$_2$)$_4$CH$_2$— | S |
| 10 | p-Phenylene diisothiocyanate |  | S |
| 11 | 2,4-Tolylene diisocyanate |  | O |
| 12 | 2,4-Chlorophenylene diisocyanate |  | O |
| 13 | 2,6-Tolylene diisothiocyanate |  | S |
| 14 | Diphenyl-4,4'-diisocyanate |  | O |
| 15 | p-Isocyanatobenzyl isocyanate | 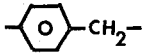 | O |
| 16 | Diphenylmethane 4,4'-diisocyanate | 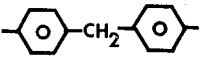 | O |
| 17 | Diphenylmethane-4,4'-diisothiocyanate | 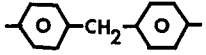 | S |
| 18 | 3,3'-Dimethyldiphenylmethane-4,4'-diisocyanate | 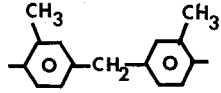 | O |
| 19 | 3,3'-Bitolylene-4,4'-diisocyanate | 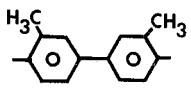 | O |
| 20 | Cyclohexane-1,2-diisocyanate |  | O |
| 21 | Cyclohexane-1,3-diisothiocyanate |  | S |
| 22 | Cyclopentyl-1,3-diisocyanate |  | O |
| 23 | Furan-2,5-diisocyanate |  | O |
| 24 | Thiophene-2,4-diisocyanate |  | O |
| 25 | Thiophene-2,5-diisothiocyanate |  | S |
| 26 | Pyrimidine-4,6-diisocyanate |  | O |

EXAMPLE 27

1,2,4-Benzene-tris-N,N',N''-(6-Carbonylaminopenicillanic Acid)

Following the procedure of Example 1 but substituting 0.67 mmole of 1,2,4-benzene triisocyanate for ethylene diisocyanate, the title compound is obtained.

EXAMPLE 28

4,5,6-Pyrimidine-tris-N,N',N''-(6-Carbonylaminopenicillanic Acid)

Following the procedure of Example 1 but substituting 1 mmole of pyrimidine-4,5,6-triisocyanate for ethylene diisocyanate, the title compound is obtained.

What is claimed is:

1. A compound of the formula

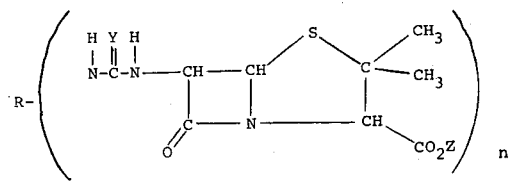

wherein Y is oxygen or sulfur, Z is hydrogen, a physiologically acceptable metal, $NH_4$, triethylamine, procaine, dibenzylamine, N-benzyl-β-phenethylamine, N,N'-dibenzylethylenediamine, N-ethyl-piperidine, or an alkyl group of from 1 to 7 carbon atoms, and R is an alkyl group of from 1 to 10 carbon atoms, a monocyclic alicyclic group of 5 or 6 carbon atoms in the ring; an aromatic carbocyclic 6-membered ring which may be joined to a second aromatic carbocyclic 6-membered ring directly or through a methylene group, or an aromatic carbocyclic 6-membered ring which may be substituted by one or two divalent alkyl groups of 1 or 2 carbon atoms; or a 5- or 6-membered monoheterocyclic group wherein the heteroatom is N, O or S, or a 5- or 6-membered diheterocyclic group wherein each heteroatom is N and n is 2 or 3.

2. A compound according to claim 1 wherein n is 2.

3. A compound according to claim 2 wherein Y is oxygen.

4. A compound according to claim 2 wherein Y is sulfur.

5. A compound according to claim 2 wherein R is a divalent alkylene group of up to 6 carbon atoms.

6. A compound according to claim 2 wherein R is phenylene, tolylene, diphenylmethane, butolylene, diphenyl or benzyl.

7. A compound according to claim 2 wherein R is an alicyclic group of 5 or 6 carbon atoms in the ring.

8. A compound according to claim 1 wherein R is a 5- or 6-membered heterocyclic group containing O, S or N as the heteroatom.

* * * * *

UNITED STATES PATENT AND TRADEMARK OFFICE
CERTIFICATE OF CORRECTION

PATENT NO. : 3,887,542
DATED : June 3, 1975
INVENTOR(S) : D. J. Perrella; J. E. Dolfini It is certified that error appears in the above-identified patent and that said Letters Patent are hereby corrected as shown below:

Col. 8, line 24, "butolylene" should read --bitolylene--.

Signed and Sealed this second Day of September 1975

[SEAL]

Attest:

RUTH C. MASON
Attesting Officer

C. MARSHALL DANN
Commissioner of Patents and Trademarks